F. R. McDONALD.
VEHICLE WHEEL SPOKE BRUSH.
APPLICATION FILED APR. 18, 1919.
1,332,266.
Patented Mar. 2, 1920.
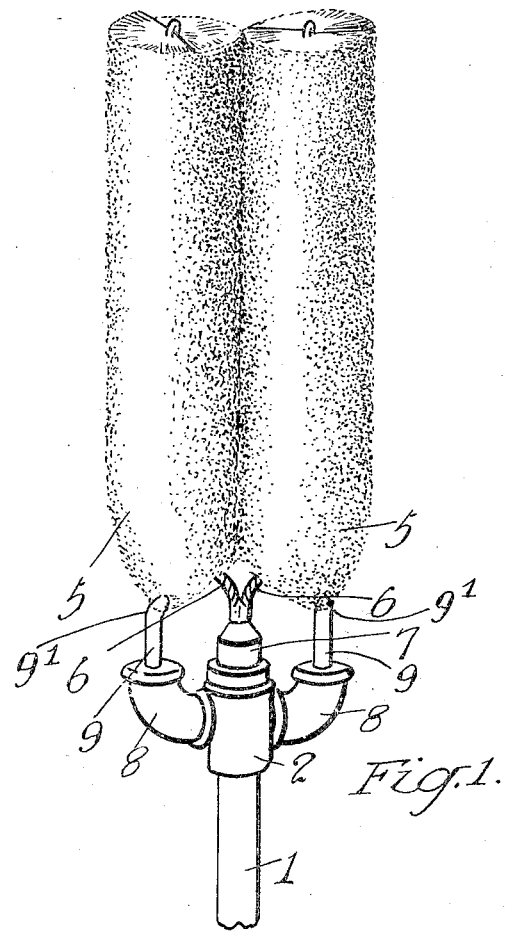
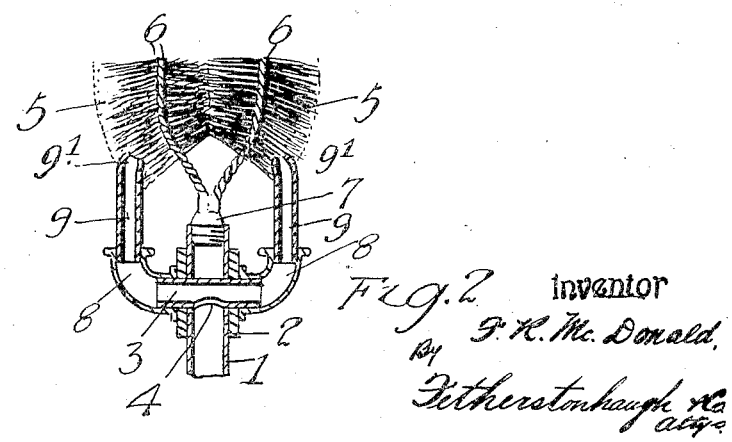
Inventor
F. R. McDonald.
By Fetherstonhaugh &Co
attys

UNITED STATES PATENT OFFICE.

FRANK RAMSAY McDONALD, OF HAMILTON, ONTARIO, CANADA, ASSIGNOR OF ONE-HALF TO GILBERT ERNEST PITTS, OF HAMILTON, ONTARIO, CANADA.

VEHICLE-WHEEL-SPOKE BRUSH.

1,332,266.  Specification of Letters Patent.  Patented Mar. 2, 1920.

Application filed April 18, 1919. Serial No. 291,125.

*To all whom it may concern:*

Be it known that I, FRANK RAMSAY MC-DONALD, of the city of Hamilton, county of Wentworth, Province of Ontario, Dominion of Canada, have invented certain new and useful Improvements in Vehicle-Wheel-Spoke Brushes, of which the following is the specification.

My invention relates to improvements in vehicle wheel spoke brushes, and the object of the invention is to devise a brush of this character by which the spokes may be thoroughly cleansed throughout, that is both at the inside and outside of the wheels and it consists essentially of a double brush on two wire stems located adjacent to each other and provided with a single inner screw plug to which stems are connected, a tubular handle into the interior threaded end of which the plug is fitted, a conduit extending crosswise of the tubular handle and communicating therewith and provided at the outer end with elbows, nozzles fitted into the outer ends of the elbows, the tubular handle and nozzles being designed to carry the water on to the pair of brushes preferably at the periphery as hereinafter more particularly explained.

Figure 1 is a perspective view of a vehicle wheel spoke brush constructed in accordance with my invention.

Fig. 2 is a vertical section through a portion of the tubular handle, nozzles and brushes.

In the drawings like characters of reference indicate corresponding parts in various figures.

1 is the tubular handle on which is fitted a sleeve 2 through which extends a cross tube or conduit 3 having an orifice 4 communicating with the handle. 5, 5 are a pair of brushes preferably cylindrical secured on the wire stems 6, 6, which are attached to or form part of the center screw plug 7, which fits into the threaded end of the tubular handle 1.

8, 8 are elbows, which are suitably screwed on to the threaded outer ends of the cross tube or conduit 3. 9, 9 are nozzles, which extend out through the elbows being preferably provided with bent ends 9′, 9′ in order to direct the water slightly inwardly, so as to throw it more evenly along the surface of the brush.

From this description it will be seen when I utilize my brush I preferably turn on the water by a suitable faucet in the handle, which is not necessary here to describe and the water under pressure forces itself out through the nozzles 9 on to the periphery of the brushes. The brushes 5, 5, may be turned on the plug 7 7 slightly depending upon the work to be done and what may be found to be the best way of driving the water whether more or less into the brushes or their peripheral surfaces.

It is evident, however, that the essential advantage in the construction of my brush and the arrangement of nozzles is that the water is directed along on to or through each brush of the pair from end to end, so that the cleaning may be done with equal facility both at the front and sides and back of the spoke. As such spokes form no obstruction to the passage of the water behind them consequently a thorough cleansing of the entire spoke is assured.

What I claim as my invention is:

1. In vehicle wheel spoke brushes, the combination with a tubular handle, of a pair of brushes, each brush of which lies adjacent to the other and the stems of which terminate in a single plug fastened in the end of the handle, and a pair of nozzles communicating with the interior of the handle and extending one on each side of the handle in proximity with each brush.

2. In a vehicle wheel spoke brushes, the combination with a tubular handle, of a pair of brushes, each brush of which lies adjacent to the other and the stems of which terminate in a single screw plug fastened in the end of the handle, a cross conduit extending across the tubular handle and provided with an orifice communicating therewith, elbows extending from the cross conduit, and nozzles forming the termination of the elbows and having their ends terminating at the inner ends of the brushes.

FRANK RAMSAY McDONALD.

Witnesses:
  GERTRUDE NICHOLSON,
  J. W. G. MITCHELL.